(12) United States Patent
Lin et al.

(10) Patent No.: US 11,570,787 B2
(45) Date of Patent: Jan. 31, 2023

(54) DATA SENDING METHOD AND APPARATUS, COMPUTER DEVICE AND STORAGE MEDIUM

(71) Applicant: GUANGDONG OPPO MOBILE TELECOMMUNICATIONS CORP., LTD., Guangdong (CN)

(72) Inventors: Yanan Lin, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/909,775

(22) Filed: Jun. 23, 2020

(65) Prior Publication Data
US 2020/0322969 A1 Oct. 8, 2020

Related U.S. Application Data

(63) Continuation of application No. PCT/CN2017/118885, filed on Dec. 27, 2017.

(51) Int. Cl.
*H04W 4/00* (2018.01)
*H04W 72/12* (2009.01)
*H04W 72/04* (2009.01)

(52) U.S. Cl.
CPC .......... *H04W 72/12* (2013.01); *H04W 72/04* (2013.01)

(58) Field of Classification Search
CPC ... H04W 72/04; H04W 72/12; H04W 72/005; H04W 72/08; H04J 2203/0069; H04B 7/2121; H04B 7/2123
See application file for complete search history.

(56) References Cited

U.S. PATENT DOCUMENTS

| | | | | |
|---|---|---|---|---|
| 10,390,256 | B2* | 8/2019 | Saiwai | H04W 28/0278 |
| 2010/0323709 | A1* | 12/2010 | Nam | H04L 5/0023 |
| | | | | 455/450 |
| 2012/0069805 | A1* | 3/2012 | Feuersanger | H04W 72/0413 |
| | | | | 370/329 |
| 2013/0163533 | A1 | 6/2013 | Anderson et al. | |
| 2013/0336293 | A1* | 12/2013 | Yang | H04W 72/12 |
| | | | | 370/336 |

(Continued)

FOREIGN PATENT DOCUMENTS

| | | |
|---|---|---|
| CN | 106304360 A | 1/2017 |
| CN | 106961741 A | 7/2017 |

(Continued)

OTHER PUBLICATIONS

International Search Report dated Oct. 11, 2018 of PCT/CN2017/118885 (4 pages).

(Continued)

*Primary Examiner* — Shantell L Heiber
(74) *Attorney, Agent, or Firm* — Perkins Coie LLP

(57) ABSTRACT

Disclosed are a data sending method and apparatus, a computer device and a storage medium. The method comprises: a terminal receiving transmission resource configuration information; and the terminal sending data on a resource configured as a transmission resource. By means of the solution of the present invention, the reasonable use of resources can be achieved.

14 Claims, 2 Drawing Sheets

(56) References Cited

U.S. PATENT DOCUMENTS

| | | | | |
|---|---|---|---|---|
| 2014/0198761 | A1* | 7/2014 | Hooli | H04W 72/08 370/329 |
| 2014/0314031 | A1 | 10/2014 | Kim et al. | |
| 2016/0135239 | A1* | 5/2016 | Khoryaev | H04W 76/14 370/329 |
| 2016/0227493 | A1* | 8/2016 | Kwak | H04W 52/325 |
| 2017/0134935 | A1* | 5/2017 | Wei | H04W 8/24 |
| 2017/0303319 | A1* | 10/2017 | Han | H04W 8/005 |
| 2018/0092065 | A1* | 3/2018 | Sheng | H04W 72/048 |
| 2018/0098331 | A1* | 4/2018 | Zhao | H04W 72/1231 |
| 2018/0324852 | A1* | 11/2018 | Van Phan | H04L 1/08 |
| 2019/0053251 | A1* | 2/2019 | Loehr | H04W 72/10 |

FOREIGN PATENT DOCUMENTS

| | | |
|---|---|---|
| CN | 107113844 A | 8/2017 |
| CN | 107197522 A | 9/2017 |
| CN | 107197523 A | 9/2017 |
| CN | 107295645 A | 10/2017 |
| WO | 2014040268 A1 | 3/2014 |
| WO | 2015021185 A1 | 2/2015 |
| WO | 2017100102 A1 | 6/2017 |

OTHER PUBLICATIONS

EPO, Examination Report for European Patent Application No. 17936935.0. dated Mar. 22, 2021. 7 pages.
IPA, Notice of Acceptance for Australian Patent Application No. 2017444441. dated Mar. 19, 2021. 3 pages.
3GPP TSG-RAN WG2 Meeting #98—Hangzhou, China, May 15-19, 2017—R2-1705317—Lenovo, Motorola Mobility LCP procedure with multiple numerologies (3 pages).
First Office Action dated Dec. 8, 2020 of Australian Application No. 2017444441 (4 pages).
Supplementary European Search Report dated Oct. 12, 2020 of European Patent Application No. 17936935.0 (8 pages).
CNIPA, First Office Action for Chinese Patent Application No. 202010775266.9. dated Aug. 27, 2021. 14 pages with English translation.
JPO, Notice of Reasons for Refusal for Japanese Patent Application No. 2020-535093. dated Jun. 18, 2021. 6 pages with English translation.
LG Electronics "Discussion on UL transmission without grant" R1-1713189; 3GPP TSG RAN WG1 Meeting #90; Prague, Czech Republic, Aug. 21-25, 2017. 8 pages.
LG Electronics Inc. "Semi-persistent scheduling in NR" R2-1704496; 3GPP TSG-RAN WG2 Meeting #98; Hangzhou, China, May 15-19, 2017. 3 pages.
Examination Report for Indian Application No. 202017026304 dated Sep. 15, 2021. 7 pages with English translation.
Notification of Reason for Refusal for Korean Application No. 10-2020-7019176 dated Nov. 12, 2021. 8 pages with English translation.
Second Office Action for Chinese Application No. 2020107752669 dated Nov. 9, 2021. 12 pages with English translation.
Second Office Action for European Application No. 17936935.0 dated Oct. 7, 2021. 6 pages.
Notice of Final Rejection for Korean Application No. 10-2020-7019176 dated May 23, 2022. 9 pages with English translation.
Third Office Action received for Chinese Application No. 202010775266.9 dated Jun. 22, 2022. 14 pages with English translation.
Decision of Refusal for Japanese Application No. 2020-535093 dated Feb. 4, 2022. 4 pages with English translation.
Decision of Rejection for Chinese Application No. 202010775266.9 dated Jan. 29, 2022. 9 pages with English translation.
Examination Report for European Application No. 17936935.0 dated Mar. 22, 2022. 6 pages.

* cited by examiner

DATA SENDING METHOD AND APPARATUS, COMPUTER DEVICE AND STORAGE MEDIUM

CROSS-REFERENCE TO RELATED APPLICATION

This application is a continuation application of International Application No. PCT/CN2017/118885, filed on Dec. 27, 2017, the entire content of which is hereby incorporated by reference.

TECHNICAL FIELD

The present disclosure relates to a wireless network technology, in particular to a method for sending data, an apparatus for sending data, a computer device and a storage medium.

BACKGROUND

A current 5G system introduces an Ultra-Reliable Low Latency Communication (URLLC) service, which is characterized by realizing ultra-high reliability (e.g. 99.999%) transmission within an extreme delay (e.g. 1 ms).

In order to achieve this goal, a concept of "Grant free" was proposed. Grant free adopts a a resource configuration mode of preconfiguring\semi-persistent-state (hereinafter referred to as "non-dynamic scheduling"), and a terminal may transmit on a configured resource according to a service requirement. This technology avoids processes of Schedule Qequest (SR) and Buffer Status Report (BSR), thus increasing effective transmission time of a terminal.

In addition, a mode of non-dynamic scheduling is often adopted for services with periodicity, such as a Voice over Internet Protocol (VoIP) service in a Long Term Evolution (LTE) system.

Currently, there are two types of non-dynamic scheduling: type 1 and type 2. Wherein, in the type 1, a Radio Resource Control (RRC) signaling is used for (semi-statically) configuring resources, which may include a time-frequency domain resource, reference symbol information, a modulation and coding mode, and a power control parameter, etc. In the type 2, a mode of a combination of RRC signaling and physical layer signaling is used (semi-static configuration, dynamic activation/deactivation). Resources configured by the RRC signaling include a time domain resource period and a power control parameter, etc., and resources configured by the physical layer signaling include a frequency domain resource, reference symbol information, and a modulation and coding mode, etc.

In order to adapt to different service types, such as the URLLC service and the VoIP service, multiple sets of non-dynamically scheduled transmission resources may be configured simultaneously. In addition, in a practical application, it is also possible to configure a dynamically scheduled transmission resource. For how to use these resources reasonably, there is no effective solution in the prior art.

SUMMARY

In view of this, the present disclosure provides a method for sending data, an apparatus for sending data, a computer device and a storage medium.

Specific technical solutions are as follows.

A method for sending data, includes: receiving, by a terminal, information of transmission resource configuration(s); and sending, by the terminal, data on a resource configured by the transmission resource configuration(s).

An apparatus for sending data, includes: a receiving unit and a sending unit; the receiving unit is configured to receive information of transmission resource configuration(s); and the sending unit is configured to send data on a resource configured by the transmission resource configuration(s).

A computer device, includes a memory, a processor and a computer program stored on the memory and runnable on the processor, wherein the processor, when executing the program, implements the method as described above.

A computer readable storage medium, stores a computer program thereon, wherein the program, when executed by a processor, implements the method as described above.

Based on the above introduction, it can be seen that by adopting the solution according to the present disclosure, a terminal can receive information of a transmission resource configuration and can send data on a resource configured by the transmission resource configuration, thus realizing a reasonable use for a resource.

DETAILED DESCRIPTION

To make a technical solution of the present disclosure more clearly understood, the solution of the present disclosure will be further explained with reference to accompanying drawings and implementations.

It is apparent that the described implementations are a part, but not all, of implementations of the present disclosure. Based on the implementations of the present disclosure, all other implementations obtained by a person of ordinary skill in the art without paying an inventive effort shall fall within the protection scope of the present disclosure.

Figure 1:
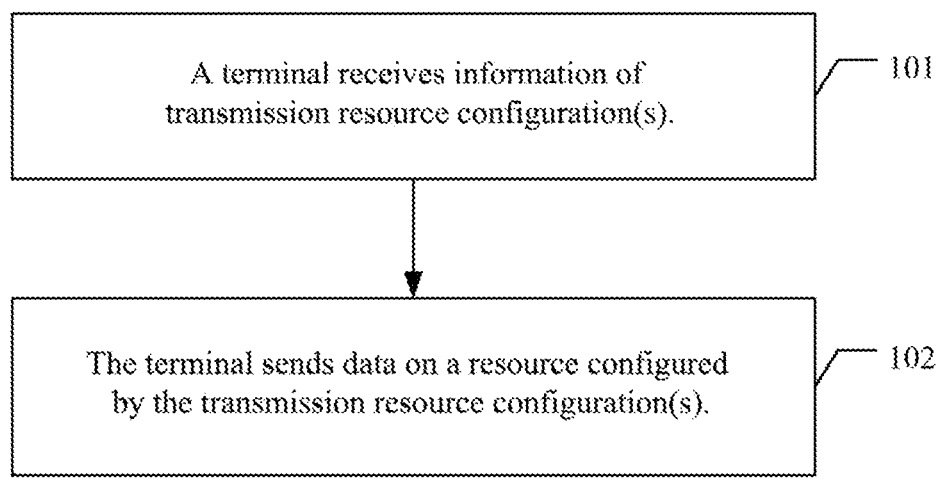
FIG. 1 is a flowchart of an implementation of a method for sending data according to the present disclosure.

FIG. 1 is a flowchart of an implementation of a method for sending data according to the present disclosure. As shown in FIG. 1, a following specific implementation mode is included.

In 101, a terminal receives information of transmission resource configuration(s).

In 102, the terminal sends data on a resource configured by the transmission resource configuration(s).

The transmission resource includes one or more of a transmission resource dynamically scheduled and a transmission resource non-dynamically scheduled. The transmission resource non-dynamically scheduled may be a Type1 transmission resource, or a Type2 transmission resource, or may include both Type1 and Type2 transmission resources.

In 101, that the terminal receives the information of the transmission resource configuration, may include: the terminal receives at least two sets of information of transmission resource configurations, which correspond to at least two transmission resource configurations; or, the terminal receives a set of information of transmission resource configurations, which contains at least two transmission resource configurations.

Before 102, the terminal may determine a transmission resource suitable for data to be transmitted from resources configured by the least two transmission resource configurations.

Typically, when the resources configured by the at least two transmission resource configurations do not overlap in the time domain, the terminal may send the data to be transmitted by using a transmission resource satisfying a condition at a current time. Whether to satisfy the condition refers to whether a configuration of a transmission resource satisfies a service transmission requirement, specifically, one or more of the following may be included: whether a Transmission Time Interval (TTI) length satisfies a delay demand, whether a Modulation and Coding Scheme (MCS) satisfies a reliability requirement, and whether a Transport Block Size (TBS) satisfies a service packet size demand.

Typically, when the resources configured by the at least two transmission resource configurations partially or completely overlap in the time domain, the terminal may determine a resource configured by at least one transmission resource configurations from the resources configured by the at least two transmission resource configurations for sending the data to be transmitted.

Typically, the terminal may determine the number of transmission resources for sending the data to be transmitted according to at least one kind of information of a traffic volume and a sending restriction.

A sending power restriction is one typical case of the sending restriction. For a scenario with a restricted power, the terminal may only use a resource configured by one transmission resource configuration to send the data to be transmitted. For a scenario with an unrestricted power, the terminal may use a resource configured by at least one transmission resource configuration to send the data to be transmitted. The terminal may determine whether a power is restricted by receiving base station configuration information, or determine whether a power is restricted by itself. For a mode of a base station configuration, a determination may be performed according to explicit indication signaling of a power restriction, or whether a power is restricted may be indirectly indicated according to other signaling, for example, according to a waveform. Typically, when the terminal adopts a mode of single-carrier sending, such as Discrete Fourier Transform Spread Orthogonal Frequency Division Multiplexing (DFT-S-OFDM), the terminal may determine that it is a power-restricted scenario. When the terminal adopts a mode of multi-carrier sending, such as OFDM, the terminal may determine that it is a power-unrestricted scenario. For another example, according to a modulation waveform, when the terminal adopts a Binary Phase Shift Keying (BPSK) related modulation mode, the terminal may determine that it is a power-restricted scenario, and when the terminal adopts a Quadrature Phase Shift Keying (QPSK) or above modulation mode, the terminal may determine that it is a power-unrestricted scenario.

The terminal determines the number of transmission resources for sending the data to be transmitted according to the traffic volume. When the traffic volume is small and one transmission resource is sufficient to send all the data to be transmitted, the one transmission resource may be adopted. When the traffic volume is large and one transmission resource is insufficient to send all the data to be transmitted, if the terminal is configured with at least 2 transmission resources, the at least 2 transmission resources may be adopted to send the data to be transmitted. The number of the transmission resources adopted by the terminal is less than or equal to the number of configured transmission resources.

Further, the above transmission resources are limited to transmission resources which satisfy a service requirement.

The terminal determines the number of transmission resources for sending the data to be transmitted according to the sending restriction and the traffic volume. Among them, a constraint for the sending restriction takes precedence over a constraint for the traffic volume. That is, when the sending restriction is only limited to that one transmission resource is used for sending the data to be transmitted, even if the traffic volume is so large that at least two transmission resources are needed to send data, only one transmission resource may be adopted to send the data to be transmitted.

The terminal may also determine at least one set of transmission resources suitable for the data to be transmitted according to at least one piece of information of a priority configuration of the transmission resource, a service type of the data to be transmitted, and a characteristic parameter of the data to be transmitted.

For example, the transmission resource suitable for the data to be transmitted may be determined based on the priority configuration of the transmission resource. Typically, a transmission resource with a higher priority is used preferentially. The priority configuration may be preset by a protocol or configured, including implicitly configured and explicitly configured.

Specifically, a mode for presetting by a protocol may include: for example, it is preset in a protocol that a priority of a transmission resource dynamically scheduled is higher than that of a transmission resource non-dynamically scheduled; and for another example, a priority is preset for one or more parameter configurations of a transmission resource. Specifically, a priority of a transmission resource with a short TTI is higher than that of a transmission resource with a long TTI, a technical advantage thereof lies in that a data delay is reduced; a priority of a transmission resource with a low MCS is higher than that of a transmission resource with a high MCS, a technical advantage thereof lies in that the reliability of data transmission is ensured; a priority of a transmission resource with a small TBS is higher than that of a transmission resource with a large TBS, a technical advantage thereof lies in that wasting of resources is avoided/reduced.

The implicit mode may include: a priority of a transmission resource is determined through a parameter configuration of the transmission resource and a priority configuration corresponding to a parameter. Specifically, the priority of the transmission resource may be determined based on one or more of TTI, MCS and TBS parameters, and a corresponding priority configuration. Herein, the corresponding priority configuration may be preset by a protocol or configured (including explicitly or implicitly configured) by signaling. In order to avoid a redundant description, a TTI configuration is taken as an example only, and other parameter configurations may also refer to similar methods. A transmission resource 1 is configured with a shorter TTI and a transmission resource 2 is configured with a longer TTI. According to a priority set for a TTI length, a short TTI has a higher priority, then the priority of the transmission resource 1 is higher than that of the transmission resource 2, a technical advantage thereof is that a data delay is reduced.

The explicit mode may include: a priority parameter is contained in a parameter configuration of a transmission resource, or a priority of a transmission resource is contained in a characteristic parameter of the data to be transmitted. For the latter, when the characteristic parameter of the data to be transmitted contains a piece of transmission resource information, the data to be transmitted may only be sent on a corresponding transmission resource, or the data to be transmitted is preferentially sent on a corresponding transmission resource.

In addition, the transmission resource suitable for the data to be transmitted may also be determined based on the service type of the data to be transmitted. There is a preset relationship between the service type of the data to be transmitted and the transmission resource. The preset relationship may be preset by a protocol or configured.

The service type may be distinguished by a logical channel or by a specific identifier. For the former, there is a preset relationship between the service type of the data to be transmitted and the transmission resource, that is, the transmission resource is determined based on the logical channel to which the data to be transmitted belongs, and there is a preset relationship between the logical channel to which the data to be transmitted belongs and the transmission resource.

The relationship between the service type of data to be transmitted and the transmission resource is preset by a protocol. For example, a service type 1 of the data to be transmitted corresponds to a transmission resource 1, i.e. data of the service type 1 is sent by adopting the transmission resource 1.

A configuration mode may be implicit or explicit. For an implicit mode, the transmission resource may be determined based on a constraint relationship between a parameter contained in the service type of the data to be transmitted and the transmission resource. For example, an available transmission resource is determined based on a TTI length parameter in a logical channel, i.e. a transmission resource may only be taken as an available transmission resource when it has a TTI length less than or equal to a TTI length parameter configuration in the logical channel. For an explicit mode, the configuration mode may include: 1) a service type parameter is contained in a transmission resource configuration, there may be one or more service type parameters; 2) a transmission resource parameter is contained in a service type configuration.

The transmission resource suitable for the data to be transmitted may also be determined based on the characteristic parameter of the data to be transmitted. There is a preset relationship between the characteristic parameter of the data to be transmitted and the transmission resource. The preset relationship is preset by a protocol or configured. The characteristic parameter of the data to be transmitted includes: at least one or more of a delay, a reliability and a data volume.

Specifically:

1) When multiple characteristic parameters are to be satisfied, there is a certain priority relationship between the characteristic parameters.

Typically, a delay>a reliability>a data volume (that the item before ">" has a higher priority, which is the same below and will not be repeated again), a technical advantage thereof lies in that: real-time transmission of data is ensured, and the terminal is prevented from having no chance or few chances to transmit data.

Typically, the delay>the data volume>the reliability, a technical advantage thereof lies in that: a data delay requirement is ensured.

Typically, the data volume>the delay>the reliability, technical advantage thereof lies in that: it is ensured to obtain chances for transmitting as much data as possible, a system efficiency is maximized, and a transmission delay is reduced as far as possible.

Typically, the data volume>the reliability>the delay, technical advantage thereof lies in that: it is ensured to obtain chances for transmitting as much data as possible, a system efficiency is maximized, and a reliability of data transmission is ensured as far as possible.

Typically, the reliability>the data volume>the delay, technical advantage thereof lies in that: on a premise that a reliability of data transmission is ensured, a system data transmission volume is improved, and a system efficiency is improved.

Typically, the reliability>the delay>the data volume, a technical advantage thereof lies in that: reliable data transmission is ensured.

2) A constraint relationship between the characteristic parameter of the data to be transmitted and the transmission resource.

For example, a low delay corresponds to a short TTI, a high reliability corresponds to a low MCS level, and a large data volume corresponds to a large TBS resource. Or vice versa. The so-called high or low may be determined by referring to a threshold value. The threshold may be preset by a protocol or configured.

3) When the above parameter requirement is satisfied and at least 2 sets of transmission resources still exist, it may be further to compress to the number of transmission resources allowed by the system based on the priority relationship between the characteristic parameters.

Typically, a long TTI>a small TBS>a high MCS, i.e. data to be transmitted with a long TTI is selected preferentially, and then data to be transmitted with a small TBS is selected, and finally data to be transmitted a high MCS is selected, a technical advantage thereof is: a conflict with short-delay data is avoided or reduced.

Typically, a long TTI>a high MCS>a small TBS, a technical advantage thereof is: a conflict with short-delay data is avoided or reduced, and a system transmission efficiency is improved.

Typically, a small TBS>a long TTI>a high MCS, a technical advantage thereof is: a resource efficiency is improved, supplement of data without information content in a TBS is avoided, and a conflict with short-delay data is further avoided.

Typically, a small TBS>a high MCS>a long TTI, a technical advantage thereof is: a resource efficiency is improved, supplement of data without information content in a TBS is avoided.

Typically, a high MCS>a small TBS>a long TTI, a technical advantage thereof is: a transmission efficiency is improved, a usage of redundant resources is avoided.

Typically, a high MCS>a long TTI>a small TBS, a technical advantage thereof is: a transmission efficiency is improved, a conflict with short-delay data is avoided.

In the above mode, the terminal determines a transmission resource suitable for the data to be transmitted mainly according to one piece of information of the priority configuration of the transmission resource, the service type of the data to be transmitted, and the characteristic parameter of the data to be transmitted. In addition, a transmission resource suitable for the data to be transmitted may also be determined based on at least two pieces of information of the priority configuration of the transmission resource, the service type of the data to be transmitted, and the characteristic parameter of the data to be transmitted. When the transmission resource suitable for the data to be transmitted is determined based on at least two pieces of information, priorities between multiple pieces of information need to be further defined.

The at least two pieces of information may respectively be indicated as follows.

1) A priority configuration of the transmission resource+a service type of the data to be transmitted Typically, the priority configuration of the transmission resource>the service type of the data to be transmitted, a technical advantage thereof lies in that: a priority is controllable and a system efficiency is high.

For example, a transmission resource 1: with a high priority, a supported service type being URLLC; a transmission resource 2: with a high priority, a supported service type being Enhance Mobile Broadband (eMBB); a transmission resource 3: with a low priority, a supported service type being the URLLC. Based on the above principle, the terminal first determines the transmission resources 1 and 2 based on the priorities, then determines the transmission resource 1 according to the service type, and then utilizes the transmission resource 1 to send the data to be transmitted.

Typically, the service type of the data to be transmitted>the priority configuration of the transmission resource, a technical advantage thereof lies in that: a transmission requirement (e.g. a delay or a reliability) of a service is ensured.

For example, a transmission resource 1: with a high priority, a supported service type being the URLLC; a transmission resource 2: with a high priority, a supported service type being the eMBB; a transmission resource 3: with a low priority, a supported service type being the URLLC. Based on the above principle, the terminal first determines the transmission resources 1 and 3 based on the service types, then determines the transmission resource 1 according to on the priority, and then utilizes the transmission resource 1 to send the data to be transmitted.

2) A priority configuration of the transmission resource+a characteristic parameter of the data to be transmitted Typically, the priority configuration of the transmission resource>the characteristic parameter of the data to be transmitted, a technical advantage thereof lies in that: a priority is controllable and a system efficiency is high.

Typically, the characteristic parameter of the data to be transmitted>the priority configuration of the transmission resource, a technical advantage thereof lies in that: a transmission requirement (e.g. a delay or a reliability) of a service is ensured.

Typically, a characteristic parameter 1 of the data to be transmitted (e.g. delay)>the priority configuration of the transmission resource>a characteristic parameter 2 of the data to be transmitted (e.g. TBS), a technical advantage thereof lies in that: a certain transmission requirement (e.g. delay or reliability) of a service is ensured, and meanwhile a transmission efficiency of the system is ensured.

3) A service type of the data to be transmitted+a characteristic parameter of the data to be transmitted Typically, the service type of the data to be transmitted>the characteristic parameter of the data to be transmitted, a technical advantage thereof lies in that: a transmission performance of a high-level service can be ensured preferentially.

Typically, the characteristic parameter of the data to be transmitted>the service type of the data to be transmitted, a technical advantage thereof lies in that: a specific performance parameter can be ensured preferentially.

Typically, the characteristic parameter 1 of the data to be transmitted (e.g. delay)>the service type of the data to be transmitted>the characteristic parameter 2 of the data to be transmitted (e.g. TBS), a technical advantage thereof lies in that: a certain performance parameter can be ensured preferentially, meanwhile priorities of different service types are taken into account.

4) A priority configuration of the transmission resource+a service type of the data to be transmitted+a characteristic parameter of the data to be transmitted Typically, the priority configuration of the transmission resource>the characteristic parameter of the data to be transmitted>the service type of the data to be transmitted, a technical advantage thereof lies in that: a system efficiency is ensured preferentially, and the characteristic parameter is ensured next.

Typically, the priority configuration of the transmission resource>the service type of the data to be transmitted>the characteristic parameter of the data to be transmitted, a technical advantage thereof lies in that: a system efficiency is ensured preferentially, and a special requirement of a specific service is ensured next.

Typically, the characteristic parameter of the data to be transmitted>the priority configuration of the transmission resource>the service type of the data to be transmitted, a technical advantage thereof lies in that: optimizing is performed for a specific requirement, a target is finely optimized, and a system efficiency is improved.

Typically, the characteristic parameter of the data to be transmitted>the service type of the data to be transmitted>the priority configuration of the transmission resource, a technical advantage thereof lies in that: the characteristic parameter and a transmission of a specific service are ensured preferentially.

Typically, the service type of the data to be transmitted>the characteristic parameter of the data to be transmitted>the priority configuration of the transmission resource, a technical advantage thereof lies in that: a transmission of a specific service is optimized, and optimizing is further performed for a specific parameter, a requirement of service transmission is ensured.

Typically, the service type of the data to be transmitted>the priority configuration of the transmission resource>the characteristic parameter of the data to be transmitted, a technical advantage thereof lies in that: a transmission of a specific service is optimized, and a system efficiency is further optimized.

Typically, the characteristic parameter 1 of the data to be transmitted>the service type of the data to be transmitted>the priority configuration of the transmission resource>the characteristic parameter 2 of the data to be transmitted, a technical advantage thereof lies in that: a specific characteristic parameter and a transmission of a specific service are ensured preferentially, and meanwhile priorities are taken into account.

Typically, the characteristic parameter 1 of the data to be transmitted>the priority configuration of the transmission resource>the service type of the data to be transmitted>the characteristic parameter 2 of the data to be transmitted, a technical advantage thereof lies in that: optimizing is performed for a specific requirement, a target is finely optimized, and a system efficiency is improved.

When the data to be transmitted contain at least two kinds of different service types or correspond to two sets of different characteristic parameters, part or all of transmission resources may be determined based on the data to be transmitted with a high service type priority or a strict characteristic parameter first. For example, when the data to be transmitted include the URLLC and the eMBB, a transmission resource may be selected according to a URLLC service or a URLLC characteristic parameter first.

In addition, in a practical application, data transmitted on a transmission resource may be determined according to a preset rule. For example, data to be transmitted may be determined according to a priority level of a service type corresponding to the data to be transmitted, and transmission is performed on a selected transmission resource.

The above is the description of method implementations, and the solution of the present disclosure will be further described below through an apparatus implementation.

Figure 2:
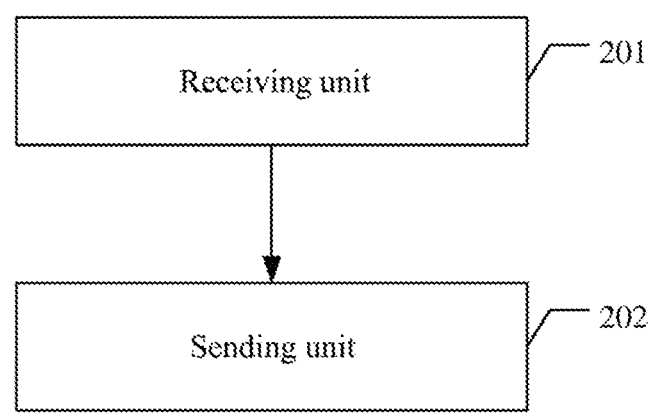
FIG. 2 is a schematic structural diagram of an implementation of an apparatus for sending data according to the present disclosure.

FIG. 2 is a schematic structural diagram of an implementation of an apparatus for sending data according to the present disclosure. As shown in FIG. 2, a receiving unit 201 and a sending unit 202 are included.

The receiving unit 201 is configured to receive information of a transmission resource configuration.

The sending unit 202 is configured to send data on a resource configured by the transmission resource configuration.

The transmission resource includes one or more of a transmission resource dynamically scheduled and a transmission resource non-dynamically scheduled. The transmission resource non-dynamically scheduled may be a Type1 transmission resource, or a Type2 transmission resource, or may include both Type1 and Type2 transmission resources.

The receiving unit 201 may receive at least two sets of information of transmission resource configurations, which correspond to at least two transmission resource configurations, or receives a set of information of transmission resource configurations, which contains at least two transmission resource configurations.

Before sending the data on the resource configured by the transmission resource configuration, the sending unit 202 may first determine a transmission resource suitable for data to be transmitted from resources configured by the at least two transmission resource configurations.

Typically, the sending unit 202 may determine the transmission resource suitable for the data to be transmitted based on a priority configuration of the transmission resource; the priority configuration is preset by a protocol or configured, including implicitly configured and explicitly configured.

Typically, the sending unit 202 may determine the transmission resource suitable for the data to be transmitted based on the service type of the data to be transmitted; there is a preset relationship between the service type of the data to be transmitted and the transmission resource, wherein the preset relationship is preset by a protocol or configured.

Typically, the sending unit 202 may determine the transmission resource suitable for the data to be transmitted based on a characteristic parameter of the data to be transmitted; there is a preset relationship between the characteristic parameter of the data to be transmitted and the transmission resource, wherein the preset relationship is preset by a protocol or configured.

Herein, the characteristic parameter of the data to be transmitted may include: at least one or more of a delay, a reliability and a data volume.

Typically, the sending unit 202 may determine the transmission resource suitable for the data to be transmitted based on at least two pieces of information of the priority configuration of the transmission resource, the service type of the data to be transmitted, and the characteristic parameter of the data to be transmitted.

In addition, when the data to be transmitted contain at least two kinds of different service types or correspond to two sets of different characteristic parameters, the sending unit 202 may determine part or all of transmission resources based on data to be transmitted with a high service type priority or a strict characteristic parameter first.

Furthermore, when resources configured by the at least two transmission resource configurations partially or completely overlap in the time domain, the sending unit 202 may determine a resource configured by at least one transmission resource configuration from the resources configured by the at least two transmission resource configurations for sending the data to be transmitted.

Typically, the sending unit 202 may determine the number of transmission resources for sending the data to be transmitted according to at least one kind of information of a traffic volume and a sending restriction.

Please refer to the corresponding description in the above-described method implementation for the specific working flows of the apparatus implementation shown in FIG. 2, which are not repeated here.

Figure 3:
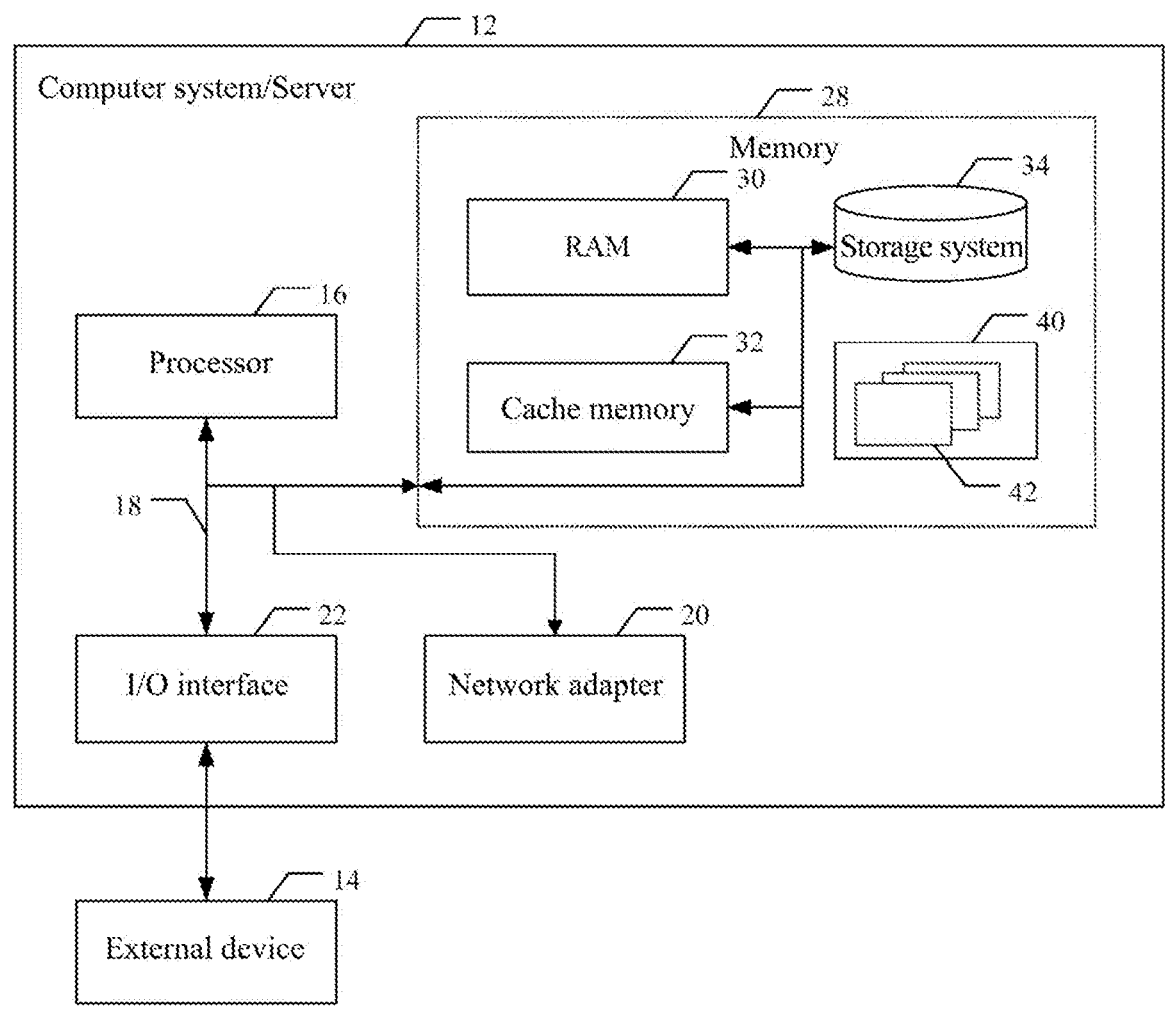
FIG. 3 shows a block diagram of an exemplary computer system/server 12 suitable for implementing an implementation of the present disclosure.

FIG. 3 shows a block diagram of an exemplary computer system/server 12 suitable for implementing an implementation of the present disclosure. The computer system/server 12 shown in FIG. 3 is only an example and should not impose any restrictions on functions and usage scopes of implementations of the present disclosure.

As shown in FIG. 3, the computer system/server 12 is represented in a form of a general-purpose computing device. Components of the computer system/server 12 may include, but are not limited to, one or more processors (processing units) 16, a memory 28, and a bus 18 connecting different system components (including the memory 28 and the processor 16).

Bus 18 represents one or more of several types of bus structures, including a storage device bus or storage device controller, a peripheral bus, a graphics acceleration port, a processor, or a local bus using any of a variety of bus structures. For example, these architectures include, but are not limited to, Industry Standard Architecture (ISA) bus, Micro Channel Architecture (MAC) bus, Enhanced ISA bus, video electronics standards association (VESA) local bus, and Peripheral Component Interconnect (PCI) bus.

The computer system/server 12 typically includes various computer system readable media. These media may be any available media which may be accessed by the computer system/server 12, including volatile and nonvolatile media, removable and non-removable media.

The memory 28 may include a computer system readable medium in a form of volatile memory, such as a Random Access Memory (RAM) 30 and/or a cache memory 32. The computer system/server 12 may further include other removable/non-removable, volatile/nonvolatile computer system storage media. As an example only, a storage system 34 may be used for reading and writing a non-removable, nonvolatile magnetic medium (not shown in FIG. 3, commonly referred to as "hard disk drive"). Although not shown in FIG. 3, a magnetic disk drive for reading from and writing into a removable non-transitory magnetic disk (e.g., "floppy disk") and an optical disk drive for reading from and writing into a removable non-transitory optical disk (e.g., CD-ROM, DVD-ROM, or other optical media) may be provided. In these cases, each drive may be connected to the bus 18 through one or more data media interfaces. The memory 28 may include at least one program product, wherein the program product has a group of (e.g., at least one) program modules configured to perform the functions of various implementations of the present disclosure.

A program/utility 40 having a group of (at least one) program modules 42 including, but not limited to, an operating system, one or more application programs, other program modules, and program data, may be stored in, for example, the memory 28, and an implementation of a network environment may be included in each or a certain combination of these examples. The program module 42 generally performs functions and/or methods in the implementations described by the present disclosure.

The computer system/server 12 may also communicate with one or more external devices 14 (e.g., a keyboard, a pointing device, a display 24, etc.), or communicate with one or more devices which enable a user to interact with the computer system/server 12, and/or communicate with any device which enables the computer system/server 12 to communicate with one or more other computing devices (e.g., a network card, a modem, etc.). This communication may be performed through an input/output (I/O) interface 22. Also, the computer system/server 12 may also communicate with one or more networks (e.g., a Local Area Network (LAN), a Wide Area Network (WAN), and/or a public network such as the Internet) through a network adapter 20. As shown in FIG. 3, the network adapter 20 communicates with other modules of the computer system/server 12 via the bus 18. It should be understood that although not shown in the figure, other hardware and/or software module may be used in conjunction with the computer system/server 12, including but not limited to: a microcode, a device driver, a redundant processing unit, an external disk drive array, a RAID system, a tape drive, or a data backup storage system, etc.

The processor 16 executes various functional applications and data processing by running programs stored in the memory 28, such as implementing the method in the implementation shown in FIG. 1.

The present disclosure also discloses a computer readable storage medium, which stores a computer program thereon, wherein, the program, when executed by a processor, will implement the method in the implementation shown in FIG. 1.

Any combination of one or more computer readable media may be adopted. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. More specific examples of the computer readable storage medium (a non-exhaustive list) include: an electrical connection with one or more wires, a portable computer disk, a hard disk, a Random Access Memory (RAM), a Read Only Memory (ROM), an erasable programmable read only memory (an EPROM or a flash memory), an optical fiber, a portable Compact Disk Read Only Memory (CD-ROM), an optical storage device, a magnetic storage device, or any suitable combination of the above. In this disclosure, a computer readable storage medium may be any tangible medium containing or storing a program that may be used by or in connection with an instruction execution system, apparatus, or device.

The computer readable signal medium may include a data signal propagated in baseband or as part of a carrier wave, in which computer readable program codes are carried. Such propagated data signals may take many forms, including, but not limited to, electromagnetic signals, optical signals, or any suitable combination of the above. The computer-readable signal medium may be any computer-readable medium other than a computer-readable storage medium, the computer-readable medium may be used to send, propagate, or transport programs for use by or in connection with an instruction execution system, apparatus, or device.

Program codes contained on a computer readable medium may be transmitted using any suitable medium, including, but not limited to, wireless, wire, fiber optic cable, RF, etc., or any suitable combination thereof.

Computer program codes for performing the operations of the present disclosure may be written in one or more programming languages or a combination thereof, wherein the programming language includes an object-oriented programming language such as Java, Small Talk, C++, as well as a conventional procedural programming language such as "C" language or a similar programming language. The program codes may be executed entirely on a user computer, partially on a user computer, as a separate software package, partially on a user computer and partially on a remote computer, or entirely on a remote computer or a server. In a case involving a remote computer, the remote computer may be connected to a user computer through any kind of network, including a Local Area Network (LAN) or a Wide Area Network (WAN), or may be connected to an external computer (e.g., via the Internet by using an Internet service provider).

In several implementations provided by the present disclosure, it should be understood that the disclosed apparatus and method, etc., may be implemented in another way. For example, the apparatus implementation described above is just exemplary. For example, division of the units is just division according to logical functions, and another division mode may be adopted during an actual implementation.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit. The integrated units may be implemented in the form of hardware or in the form of hardware plus software functional units.

The integrated units implemented in the form of software functional units may be stored in a computer readable storage medium. The above-mentioned software functional units are stored in a storage medium including several instructions for causing a computer device (which may be a personal computer, a server, or a network device and so on) or a processor to perform parts of acts of the methods described in various implementations of the present disclosure. The aforementioned storage medium includes: various media which may store program codes, such as, a U disk, a mobile hard disk, a Read-Only Memory (ROM), a Random Access Memory (RAM), a magnetic disk or an optical disk, etc.

The above description is only better implementations of the present disclosure, and is not intended to limit the present disclosure. Any modification, equivalent substitution, improvement and the like made within the spirit and principle of the present disclosure shall be included in the scope of protection of the present disclosure.

What we claim is:
1. A method for sending data, comprising:
   receiving, by a terminal, one piece of information of transmission resource configurations, wherein the one piece of information contains at least two transmission resource configurations;
   determining, by the terminal, a transmission resource suitable for data to be transmitted from the transmission resources configured by the at least two transmission resource configurations; and sending, by the terminal, data on the determined transmission resource, wherein, determining, by the terminal, the transmission resource suitable for the data to be transmitted from the transmission resources configured by the at least two transmission resource configurations, comprises:

determining, by the terminal, the transmission resource suitable for the data to be transmitted from the transmission resources configured by the at least two transmission resource configurations based on a logical channel to which the data to be transmitted belongs, wherein there is a preset relationship between the logical channel to which the data to be transmitted belongs and the transmission resource suitable for the data to be transmitted, wherein the preset relationship is configured by a transmission resource parameter contained in a service type configuration, wherein the transmission resource configured by the at least two transmission resource configurations includes one or more of a transmission resource dynamically scheduled and a transmission resource non-dynamically scheduled, wherein a priority of the transmission resource dynamically scheduled is higher than a priority of the transmission resource non-dynamically scheduled.

2. The method according to claim 1, wherein the transmission resource non-dynamically scheduled comprises at least one of following:

a resource configured using Radio Resource Control (RRC) signaling, and a resource configured using a combination of RRC signaling and physical layer signaling.

3. The method according to claim 1, wherein, determining, by the terminal, the transmission resource suitable for the data to be transmitted from the transmission resources configured by the at least two transmission resource configurations, comprises:

determining, by the terminal, a resource configured by at least one transmission resource configurations from the resources configured by the at least two transmission resource configurations for sending the data to be transmitted, when the resources configured by the at least two transmission resource configurations partially or completely overlap in a time domain.

4. An apparatus for sending data, comprising: a memory and a processor, the memory storing one or more computer programs that, when executed by the processor, cause the apparatus to execute operations of:

receiving one piece of information of transmission resource configurations, wherein the one piece of information contains at least two transmission resource configurations;

determining a transmission resource suitable for data to be transmitted from the transmission resources configured by the at least two transmission resource configurations; and sending data on the determined transmission resource, wherein, the apparatus is further caused to executed an operation of determining the transmission resource suitable for the data to be transmitted from the transmission resources configured by the at least two transmission resource configurations is based on a logical channel to which the data to be transmitted belongs, wherein, there is a preset relationship between the logical channel to which the data to be transmitted belongs and the transmission resource suitable for the data to be transmitted, wherein the preset relationship is configured by a transmission resource parameter contained in a service type configuration, wherein the transmission resource configured by the at least two transmission resource configurations includes one or more of a transmission resource dynamically scheduled and a transmission resource non-dynamically scheduled, wherein a priority of the transmission resource dynamically scheduled is higher than a priority of the transmission resource non-dynamically scheduled.

5. The apparatus according to claim 4, wherein the transmission resource non-dynamically scheduled comprise at least one of following: a resource configured using Radio Resource Control (RRC) signaling, and a resource configured using a combination of RRC signaling and physical layer signaling.

6. A method for sending data, comprising:

receiving, by a terminal, information of transmission resource configurations, wherein the information contains at least two transmission resource configurations, transmission resources configured by the at least two transmission resource configurations include a transmission resource dynamically scheduled and a transmission resource non-dynamically scheduled, or a transmission resource dynamically scheduled;

determining, by the terminal, a transmission resource suitable for data to be transmitted from the transmission resources configured by the at least two transmission resource configurations; and sending, by the terminal, data on the determined transmission resource, wherein, determining, by the terminal, the transmission resource suitable for the data to be transmitted from the transmission resources configured by the at least two transmission resource configurations, comprises:

determining, by the terminal, the transmission resource suitable for the data to be transmitted based on at least two pieces of information of a priority configuration of the transmission resource, a service type of the data to be transmitted, and a characteristic parameter of the data to be transmitted.

7. The method according to claim 6, wherein, determining, by the terminal, the transmission resource suitable for the data to be transmitted from the transmission resources configured by the at least two transmission resource configurations, comprises:

determining, by the terminal, a resource configured by at least one transmission resource configurations from the resources configured by the at least two transmission resource configurations for sending the data to be transmitted, when the resources configured by the at least two transmission resource configurations partially or completely overlap in a time domain.

8. The method according to claim 6, wherein, determining, by the terminal, the transmission resource suitable for the data to be transmitted based on at least two pieces of information of a priority configuration of the transmission resource, a service type of the data to be transmitted, and a characteristic parameter of the data to be transmitted comprises:

determining, by the terminal, the transmission resource suitable for the data to be transmitted based on a priority configuration of the transmission resource and a service type of the data to be transmitted; or determining, by the terminal, the transmission resource suitable for the data to be transmitted based on a priority configuration of the transmission resource and a characteristic parameter of the data to be transmitted; or determining, by the terminal, the transmission resource suitable for the data to be transmitted based on a service type of the data to be transmitted and a characteristic parameter of the data to be transmitted; or determining, by the terminal, the transmission resource suitable for the data to be transmitted based on a priority configuration of the transmission resource, a service type of the data to be transmitted, and a characteristic parameter of the data to be transmitted.

9. The method according to claim 8, wherein, the characteristic parameter of the data to be transmitted comprises: at least one or more of a delay, a reliability and a data volume, and wherein the delay corresponding to TTI parameter of logical channel, the reliability corresponding to MCS level, the data volume corresponding to TBS parameter.

10. The method according to claim 8, wherein, determining, by the terminal, the transmission resource suitable for the data to be transmitted based on a priority configuration of the transmission resource and a service type of the data to be transmitted, comprises:

determining, by the terminal, the transmission resource suitable for the data to be transmitted based on a order of priorities of the priority configuration of the transmission resource and the service type of the data to be transmitted.

11. The method according to claim 8, wherein, determining, by the terminal, the transmission resource suitable for the data to be transmitted based on a priority configuration of the transmission resource and a characteristic parameter of the data to be transmitted, comprises:

determining, by the terminal, the transmission resource suitable for the data to be transmitted based on a order of priorities of the priority configuration of the transmission resource and the characteristic parameter of the data to be transmitted.

12. The method according to claim 8, wherein, determining, by the terminal, the transmission resource suitable for the data to be transmitted based on a service type of the data to be transmitted and a characteristic parameter of the data to be transmitted, comprises:

determining, by the terminal, the transmission resource suitable for the data to be transmitted based on a order of priorities of the service type of the data to be transmitted and the characteristic parameter of the data to be transmitted.

13. The method according to claim 8, wherein, determining, by the terminal, the transmission resource suitable for the data to be transmitted based on a priority configuration of the transmission resource, a service type of the data to be transmitted, and a characteristic parameter of the data to be transmitted, comprises:

determining, by the terminal, the transmission resource suitable for the data to be transmitted based on a order of priorities of the priority configuration of the transmission resource, the service type of the data to be transmitted and the characteristic parameter of the data to be transmitted.

14. The method according to claim 6, wherein, when the data to be transmitted contain at least two kinds of different service types or correspond to two sets of different characteristic parameters, part or all of transmission resources are determined based on the data to be transmitted with a high service type priority or a strict characteristic parameter first.

* * * * *